June 26, 1962

J. B. DWYER 3,040,718

FURNACE

Filed May 3, 1955

2 Sheets-Sheet 1

INVENTOR.
JOHN B. DWYER

BY *J. H. Palmer*
*James E. Bryan*
ATTORNEYS

June 26, 1962   J. B. DWYER   3,040,718
FURNACE
Filed May 3, 1955   2 Sheets-Sheet 2
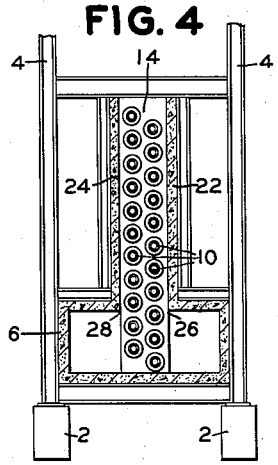
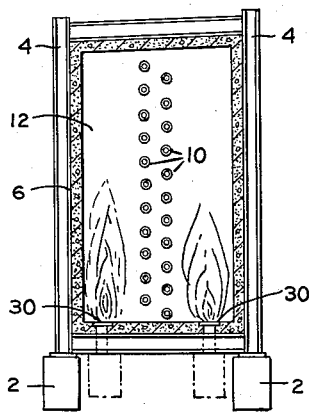
INVENTOR.
JOHN B. DWYER
BY
ATTORNEYS

# 3,040,718
FURNACE
John B. Dwyer, Baldwin, N.Y., assignor to The M. W. Kellogg Company, Jersey City, N.J., a corporation of Delaware
Filed May 3, 1955, Ser. No. 505,718
1 Claim. (Cl. 122—356)

This invention relates to a furnace, and more particularly to a reheat furnace, for heating the discharge from a hydroforming reactor, such as a stationary bed hydroforming reactor containing platinum catalyst, before the discharge is charged to another reactor in series in which further reforming of the charge stock is effected. However, the furnace is not restricted to this use and is of general application wherever a high efficiency furnace of this type is required.

The furnace of the present invention uses horizontal tubes which has the desirable effect of eliminating header costs and reducing pressure drop. The compound radiant and convection tubes employed in the furnace permit the use of fewer headers than is commonly found in furnaces performing the same operation.

Figure 1:
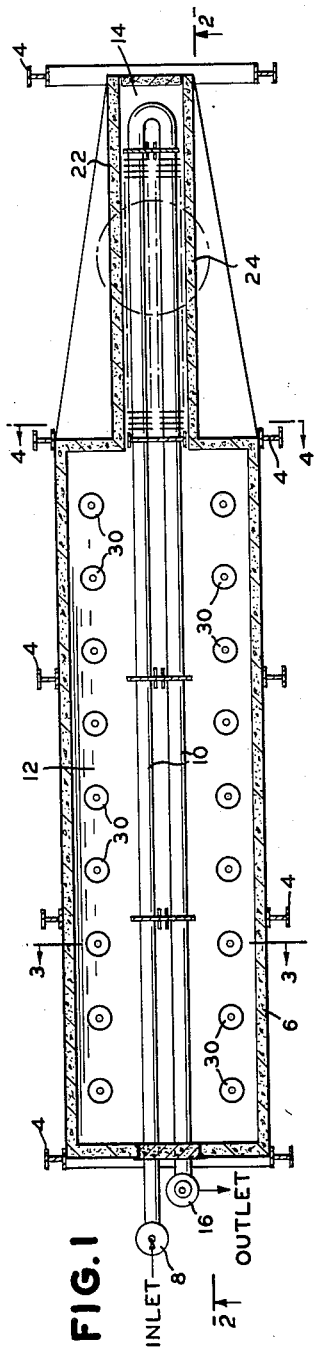
Figure 2:
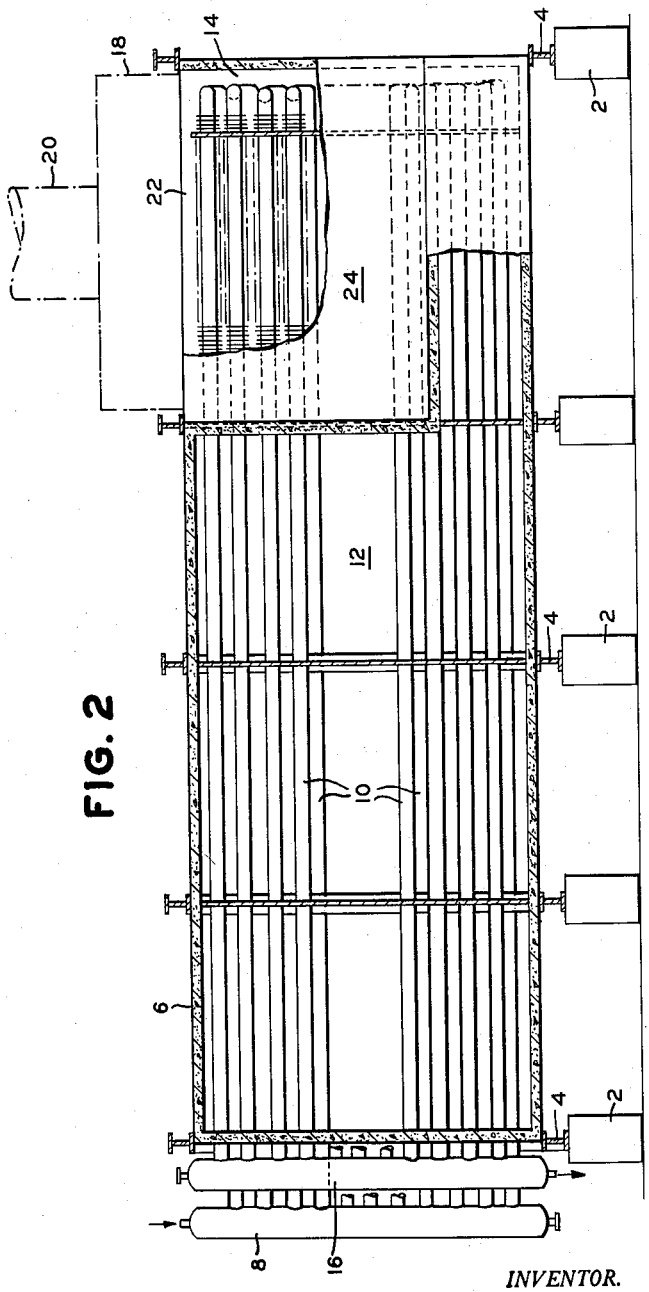

Referring to the accompanying drawings in which one embodiment of the furnace of the present invention is shown, FIGURE 1 is a plan view of the novel furnace of the invention, FIGURE 2 is a sectional view in elevation taken on line 2—2 of FIGURE 1 and looking in the direction of the arrows, FIGURE 3 is a sectional view taken on line 3—3 of FIGURE 1 and looking in the direction of the arrows, and FIGURE 4 is a sectional view taken on line 4—4 of FIGURE 1 and looking in the direction of the arrows.

Referring to FIGURES 1 and 2 of the drawing, it will be seen that the furnace is supported on the concrete footings 2. The frame of the furnace is composed of a series of I beams 4 which support the shell of the furnace 6, which is preferably made of steel lined with insulating concrete.

The furnace is provided at the left-hand end thereof, as viewed in FIGURE 1, with an inlet manifold 8, to which are connected a plurality of tubes 10 which pass through the radiant section 12 of the furnace and through the convection section 14 of the furnace where they form a U bend and return through the convection section 14 and the radiant section 12, passing out of the left-hand end of the furnace, as viewed in FIGURE 1, where they connect with an outlet manifold 16. All of the tubes of this tube bank may be finned, if desired. At the right-hand end of the furnace, as viewed in FIGURES 1 and 2, is the furnace breeching 18, shown in phantom, having the stack 20 mounted thereon.

As will be seen from FIGURES 1 and 4, the cross-sectional area of the flue gas passage in the convection section is decreased by constructing the walls 22 and 24 in the convection section in a manner such that the distance between the walls and the tube bank is decreased. This increases the velocity of the flue gas past all of the tubes above the points 26 and 28, shown in FIGURE 4, where the constriction of the flue gas passage begins.

The furnace is fired by a series of burners 30 mounted on the floor of the furnace on either side of the tube bank 10. These burners may be of any conventional type, such as sealed port gas burners.

The arch and floor of the furnace may be constructed from 5 inch insulating concrete and ¼ inch steel plate, which the end walls, side walls, and convection walls may be constructed from 5 inch insulating concrete and 3/16 inch steel plate. The stack and breeching are desirably fabricated from steel plates.

Performance data for a furnace of the type shown in FIGURES 1 to 3 of the drawing are given in the following tables:

Table I

| | |
|---|---|
| Total furnace duty | 18,400,000 B.t.u. per hour. |
| Over-all efficiency | 61.73 percent lower heating value. |
| Total normal heat liberation | 29,800,000 B.t.u. per hour. |
| Fuel used in furnace—cracked gas: | |
| Lower heating value | 20,560 B.t.u./lb. |
| Rate | 1450 lbs./hour. |
| Flue gas temperature to convection section | 1762 deg. F. |
| Flue gas temperature leaving furnace | 1300 deg. F. |
| Exposed radiant refractory temperature | 1650 deg. F. |
| Excess air from furnace | .25 percent. |
| Total exposed surface (includes bends) | 2084 sq. ft. |

Table II

Coil:
| | |
|---|---|
| Throughput, moles per hour | 12,740.8 |
| Throughput, pounds per hour | 282,087 |
| Temperature at coil inlet, °F | 920 |
| Temperature at coil outlet, °F | 985 |
| Pressure at coil inlet, p.s.i.g | 311 |
| Pressure at coil outlet, p.s.i.g | 308 |
| Total coil duty, B.t.u. per hour | 18,400,000 |
| Percent vaporized | 100 |

Radiant section:
| | |
|---|---|
| Heat liberated, B.t.u. per hour | 29,800,000 |
| Exit flue gas temperature, °F | 1762 |

Table III

Radiant section:
| | |
|---|---|
| Type of burner | sealed port, gas only |
| Liberation per burner | 1,990,000 |
| Number of burners | 18 |

It will be obvious to those skilled in the art that many modifications may be made within the scope of the present invention without departing from the spirit thereof, and the invention includes all such modifications.

I claim:

A furnace comprising a longitudinally extending radiant section, a convection section extending longitudinally from one end of said radiant section, said sections centered along a common vertical plane and said convection section of lesser width than said radiant section, a series of burner means in said radiant section on each side of said vertical plane and distributed along said plane for substantially the full length of said radiant section, stack means, the adjacent ends of said sections in communication for flow of combustion gases from said radiant section to said convection section, said convection section in communication with said stack means for flow of combustion gases from said convection section to said stack means, a vertical bank of longitudinally disposed tubes positioned on each side of said plane and extending for substantially the full length of said sections, said tube banks in said radiant section positioned between said burner means and said plane, and flow reversing means connecting corresponding tubes of said banks to provide a plurality of parallel flow paths for the medium to be heated, each of said flow paths comprising a run through the radiant section, a run through the convection section, reversal at the end of the convection section, a return run through the convection section and a return run through the radiant section, corresponding tubes of said banks disposed in substantially the same horizontal plane and positioned to receive radiant heat for their full extent in said radiant section from said burner means in said radiant section.

References Cited in the file of this patent

UNITED STATES PATENTS

| | | |
|---|---|---|
| 400,453 | Hartung | Apr. 2, 1889 |
| 1,883,925 | Hyde | Nov. 25, 1932 |
| 1,935,617 | Cross | Nov. 21, 1933 |
| 2,105,821 | Parsons | Jan. 18, 1938 |
| 2,340,289 | Wallis et al. | Feb. 1, 1944 |

FOREIGN PATENTS

| | | |
|---|---|---|
| 204,162 | Great Britain | Sept. 27, 1923 |